April 10, 1951 F. C. FAHNESTOCK 2,548,295
HYDROCARBON CONVERSION AND CATALYST
REGENERATION APPARATUS
Filed Feb. 27, 1946 3 Sheets-Sheet 1
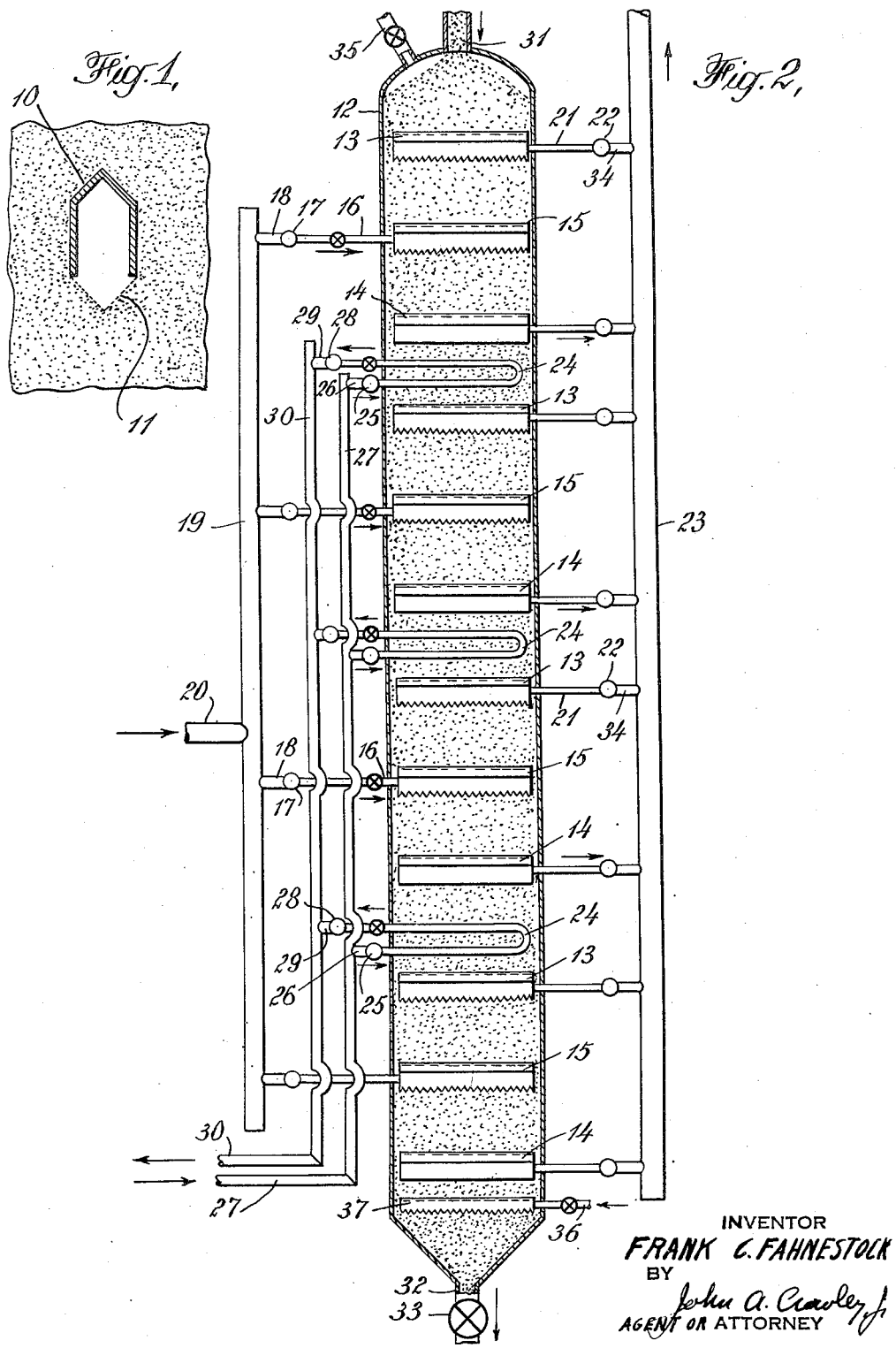
INVENTOR
FRANK C. FAHNESTOCK
BY
John A. Crowley Jr.
AGENT OR ATTORNEY

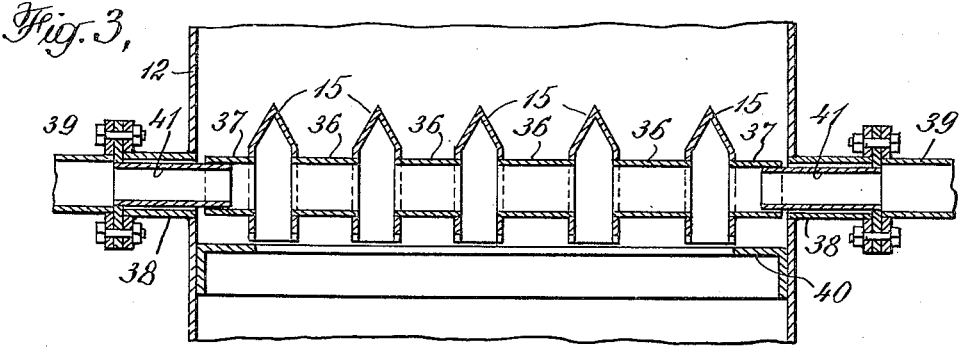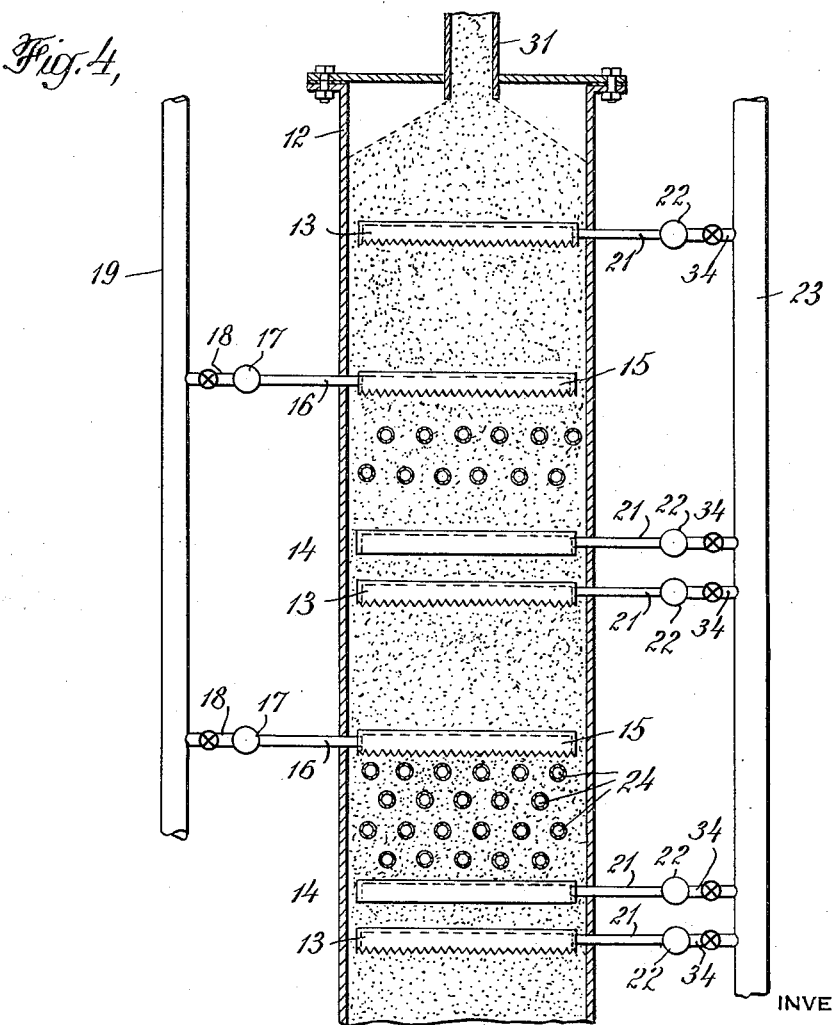

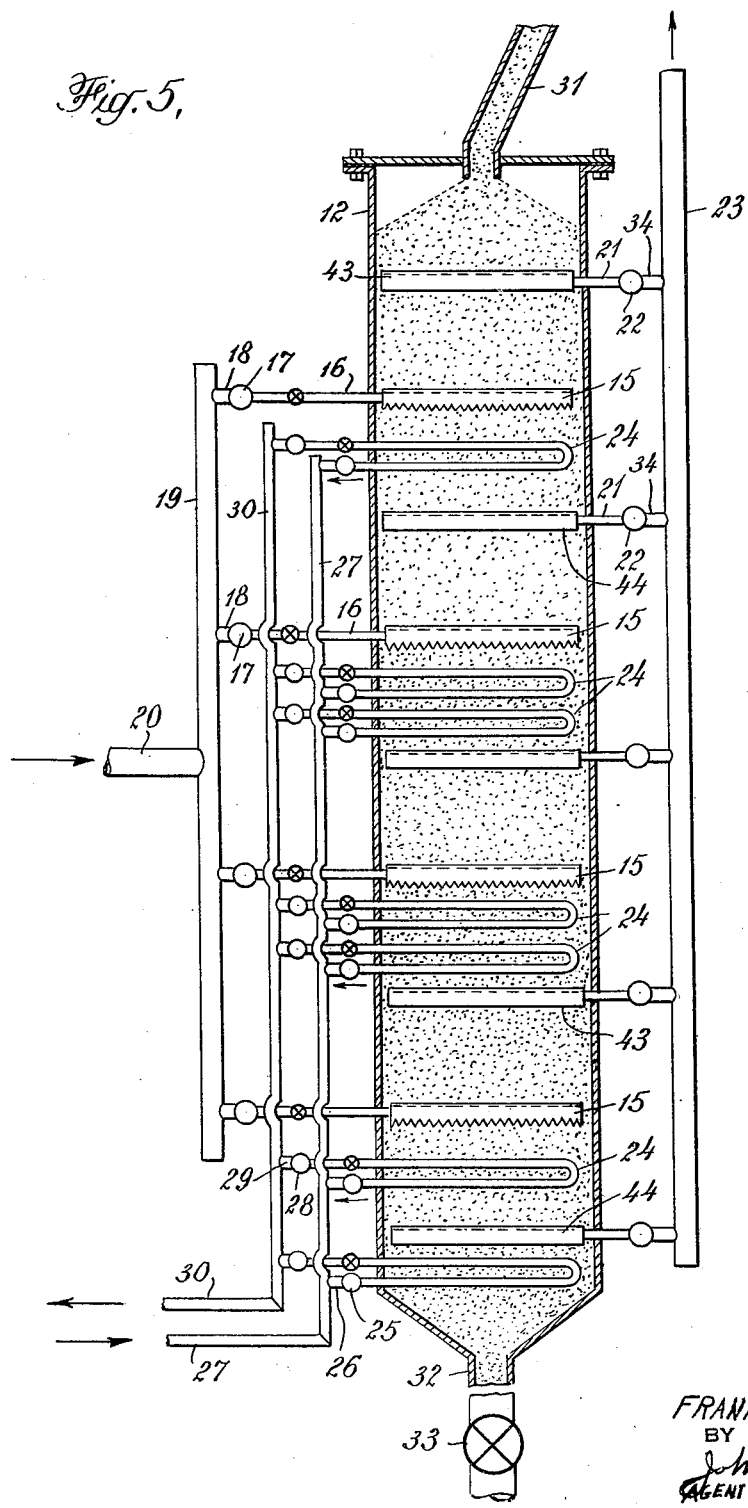

Patented Apr. 10, 1951

2,548,295

UNITED STATES PATENT OFFICE 2,548,295

HYDROCARBON CONVERSION AND CATALYST REGENERATION APPARATUS

Frank C. Fahnestock, Manhasset, N. Y., assignor to Socony-Vacuum Oil Company, Incorporated, a corporation of New York Application February 27, 1946, Serial No. 650,642

3 Claims. (Cl. 23—288)

This invention has to do with an improvement in apparatus for conducting thermochemical gaseous reactions in the presence of a moving particle form solid material which may or may not be catalytic in nature. This invention has specifically to do with an improved means for distributing and collecting gaseous materials in hydrocarbon conversion and catalyst regeneration apparatus, wherein the contact material flows as a substantially compact column of solid particles. The invention may also be applied to apparatus for other uses such as gas-solid heat exchange, gas adsorption and purification, solid treating.

The hydrocarbon conversion process has recently been developed as one wherein a particle form adsorbent catalytic material is passed as a substantially compact mass of particles at temperatures of the order of 800° F. and higher cyclically through a conversion zone wherein it is contacted with a hydrocarbon material such as a gas oil to effect the conversion thereof and through a regeneration zone wherein it is contacted with a combustion supporting gas acting to burn from the catalyst a carbonaceous contaminant deposited thereon during the hydrocarbon conversion.

The contact material in such processes may partake of the nature of natural clays, treated clays, bauxites or synthetic associations of silica, alumina or silica and alumina to which other materials such as small percentages of certain metallic oxides may be added for special purposes. Such contact materials may range in particle size from about 4 to 100 mesh and may preferably fall within the range of about 4–8 mesh as measured by Tyler Standard Screen analysis.

In order to increase the gaseous throughput capacity of vessels wherein the contact material flows as a substantially compact mass or column of downwardly moving solid particles, it has been found necessary to introduce and withdraw gaseous material at a number of locations along the length of the vessel so as to divide it into a plurality of superposed stages for gas flow. This is particularly true of catalyst regenerators and also of hydrocarbon convertors where very high gaseous throughput capacity is desired. The gaseous material may be introduced into and withdrawn from the column of catalyst within such multistage vessels by means of vertically spaced rows of horizontally extending gas collector and distributor trough members positioned at a plurality of levels within the vessel and provided with appropriate external gas inlet or outlet manifolding. It has been found that when such trough members are used at a plurality of levels in a gas-solid contacting vessel of commercial size, the contact material flow downwardly through the vessel, instead of being steady and uniform, tends to be "jerky" or "bumpy"; that is the contact material column at periodic intervals suddenly surges downwardly a short distance through the vessel at a much higher than normal rate, and then comes to a sudden stop causing a severe "bump" in the vessel. This "bumping" is very serious and undesirable in commercial apparatus because it results in uneven operation and it gives rise to serious structural vibrations which if continued over a long period of time can result in structural failure of the apparatus or its supporting members and the development of gas leaks in joints and piping.

A major object of this invention is the provision in a multistage gas-solid contacting vessel of certain improvements in gas distributing means and collecting means construction and arrangement which will minimize or eliminate the above mentioned difficulty while preventing substantial entrainment of contact material particles in the effluent gas stream.

Another object of this invention is the provision of an improved apparatus of the multistage type for catalyst regeneration.

Another object is the provision in a hydrocarbon conversion apparatus wherein the catalyst flows downwardly as a substantially compact column of solid particles of an improved means for distributing gaseous reactants into the catalyst column and withdrawal of gaseous products from the catalyst column at a plurality of levels without substantial interference with the catalyst flow.

These and other objects will become apparent from the following discussion of the drawings attached hereto wherein Figure 1 is a sectional view of an inverted trough member such as has been normally used for gas distribution and collection in gas-solid contact vessels; Figure 2 is an elevational view, partially in section, showing a preferred arrangement of the invention; Figure 3 is a sectional view showing details of a modified and preferred trough and manifold arrangement; Figures 4 and 5 are elevational views, partially in section showing modified apparatus arrangements according to this invention. All of these drawings are highly diagrammatic in form.

Turning now to Figure 1, we find a vertical sectional view of an inverted, gable-roofed trough member 10 such as has been used by the art for gas distribution and collection in gas-solid contacting vessels. It has been found that when such inverted trough members, open along their bottoms, are employed for distributing gas into a column of solid particles and collecting gas therefrom there is a tendency for segregation and accumulation of the smaller sized solid particles along the upper portions of the surface formed by the normal angle of repose of the solid particles directly below the distributor and collector troughs. For example, in Figure 1, the dotted line 11, represents the line of the normal angle of repose of the contact material involved under the trough. When the gas flow to or from trough 10 is high, fines tend to accumulate under the trough, at a somewhat different angle of repose. After this accumulation reaches a certain point, depending upon the operating conditions involved, the accumulation of fines at 12 suddenly falls away and joins the main mass of material and particles of average size slide into place under the trough at a somewhat different angle of repose. This phenomenon is particularly noticeable on gas distributor troughs and collector troughs receiving gas from the column therebelow. This phenomenon has no great effect on the overall column flow in vessels wherein only a few troughs are employed, but in multistage vessels wherein a plurality of rows of gas distributor and collector trough members are employed the accumulative effect of the "building up" and sudden "falling away" of fines below the troughs has been found to result in a jerky type of catalyst column flow characterized by a periodic sharp drop in the column with a resultant "bump." The applicant has discovered that this difficulty may be eliminated by serrating the lower edges of the gas distributor trough members, and those collector trough members receiving gas only from distributor troughs spaced in the column vertically therebelow. The applicant has also discovered that if any collector trough members receiving gas in part or entirely from distributor trough members spaced vertically thereabove in the catalyst column, are similarly serrated, the "build up" of fines under the trough is aggravated and also excessive entrainment of both fines and normal-sized particles in the effluent gas results. It has been found that when distributor trough members and those collector trough members receiving gas only from the catalyst column below are provided with serrated lower edges and those collecting troughs receiving gas entirely or partially from the catalyst column thereabove are provided with substantially non-serrated lower edges, then the irregular type of catalyst flow characteristic of normal trough arrangements is minimized or substantially eliminated and at the same time entrainment of solid particles in the effluent gas is substantially avoided.

Turning now to Figure 2, we find a typical apparatus arrangement according to this invention. In Figure 2, 12 is a gas-solid contacting vessel which may be employed either as a catalyst regenerator or for hydrocarbon conversion. Within the vessel 12 are positioned a plurality of vertically spaced sets of gas distributing and collecting trough members. Each set is comprised of two vertically spaced rows of horizontally extending, inverted gas collecting trough members 13 and 14, the members in each row being spaced horizontally apart to permit free flow of contact material therebetween and approximately midway between said rows of collecting trough members a row of similar gas distributing trough members 15. Only one trough member in each row is visible in Figure 2. The trough members are preferably closed on their opposite ends to prevent inflow of solid particles at their ends. The trough members shown have gable shaped roofs but troughs of other shapes, for example, purely angular shaped troughs may be used. The arrangment is such as to provide a plurality of superposed stages wherein the gas flow is alternately upward through the contact material column and downwardly in successive stages. It will be noted that all gas distributing trough members 15 and those collecting trough members 13 receiving gas only from the contact material column therebelow have their lower longitudinal edges serrated or saw-toothed. On the other hand, those collecting trough members 15 receiving gas from the column therebelow are provided with substantially non-serrated lower edges. Gas inlet pipes 16 are connected through the vessel shell under each inlet trough and connect on their opposite ends to a manifold 17 which is in turn connected through a conduit 18 to a common gas inlet manifold 19 to which gas is supplied through conduit 20. Similarly outlet pipes 21 are provided for each gas collecting trough. The pipes 21 in each row connect into a manifold 22 which in turn is connected through conduit 34 to an outlet manifold 23. Between each set of gas distributing and collecting trough members are provided rows of heat transfer coils 24 which connect on one end into a horizontal manifold 25 which in turn is connected through a conduit 26 to a common heat exchange fluid inlet manifold 27. The opposite ends of coils 24 connect through manifold 28, and conduit 29 to a common outlet manifold 30. An external system (not shown) for circulating heat exchange fluid is provided. It will be understood that other suitable arrangements of heat transfer tubes and auxiliary manifolding may be substituted for the construction shown. An inlet 31 for solid material is provided at the upper end of vessel 12 and an outlet 32 bearing a flow control valve 33 is provided at the lower end of the vessel.

Assuming that the vessel 12 is to be used as a catalyst regenerator, hot spent catalyst at a suitable temperature (for example 800° F.) for initiating contaminant combustion is introduced into the upper end of vessel 12 through conduit 31. Regenerated catalyst is withdrawn through conduit 32 at a rate controlled by valve 33 so that the contact material passes downwardly through the vessel as a substantially compact column. A suitable combustion supporting gas such as air which may or may not be preheated is introduced through conduit 20 to manifold 19 from which it flows through conduits 18, manifolds 17 and pipes 16 under the gas distributing troughs in each row thereof. Air flows out from under each gas distributing trough and passes in part upwardly through the catalyst to collecting troughs 13 thereabove and in part downwardly to collecting troughs 14 therebelow. Spent regeneration gas passes from collecting troughs through pipes 21, manifolds 22 and conduits 34 to outlet manifold 23. The excess heat liberated by burning of the carbonaceous contaminant is removed by means of an external heat exchange fluid which may be a gas such as steam or a liquid such as low melting point alloys or mixtures of inorganic salts. The heat exchange fluid is passed through the coils by means of manifolding shown and cooled externally in apparatus, not shown.

If the vessel 12 is to be used for hydrocarbon conversion, for example, the conversion to gasoline containing products of a gas oil boiling within the approximate range 450–750° F. existing in the gaseous phase, the flow of catalyst and gaseous materials is substantially the same as described hereinabove. For many conversion operations the heat exchange transfer which would be used to supply heat required for conversion may be entirely eliminated. It is also desirable when using the vessel for hydrocarbon conversion to maintain an inert gas blanket within the upper end thereof by introduction of an inert gas such as steam or flue gas through conduit 35. Also purge gas such as steam or flue gas may be introduced through pipes 36 to an extra row of distributing trough members 37 positioned near the bottom of vessel 12.

It will be understood that the drawings are highly diagrammatic and the invention is not to be limited to the particular gas inlet and outlet manifolding construction shown in Figure 2. A preferred means for introducing gas under distributing trough members or withdrawing gas from under collecting trough members is shown in Figure 3, wherein 12 represents the vessel shell, and 15 represents the gas distributing troughs in a given row. The adjacent trough members are connected in gas flow communication with each other by means of nipples 36, open on either end, connected centrally through the trough side walls. End nipples 37 are provided on the end trough members. Flanged nozzles 38 are welded to either side of the vessel 12 and a flanged sleeve 41 fits through the nozzle 38 and extends under the nipples 37 to place the trough members in gas flow communication with the flanged inlet conduits 39 and to help support the trough structure. An angle 40 welded around the vessel also serves as a support for the structure.

Turning to Figure 4 we find an elevational view, partially in section, of an upper portion of a gas-solid contact vessel which is in general similar to that shown in Figure 2, and like parts bear like numerals. In the arrangement shown in Figure 4 the heat exchange coils 24 are positioned at right angles to the length of the trough members and are positioned between the row of distributor trough members and the bottom row of collector trough members of each set of distributor and collector trough members rather than between sets as shown in Figure 2. This arrangement permits the spacing of successive sets closer together resulting in a substantial saving in vessel volume required and also permits simultaneous reaction and heat transfer in alternate stages as opposed to reaction entirely in the absence of heat transfer and cooling entirely in the absence of reaction as in Figure 2. It will be noted that here too those collecting trough members receiving gas from the column thereabove have non-serrated lower edges.

In Figure 5 there is shown another modified arrangement, like parts again bearing like numerals. In this arrangement the trough members are so arranged in vertically spaced rows that every alternate row consists of distributing trough members 15 having serrated lower edges. The remaining alternate rows consist of collecting trough members. Inasmuch as every collecting trough member excepting the upper row of members in this arrangement receives gas in part from the column below and in part from the column above, it has been found necessary that all of the collecting troughs be provided with substantially non-serrated lower edges to provide proper operation. In the arrangement shown in Figure 5, heat transfer coils are positioned in alternate stages so as to permit alternate reaction in the presence of and in the absence of heat transfer in successive stages similarly to the arrangement shown in Figure 4. It will also be noted that in the arrangement shown in Figure 5, the number of heat transfer tubes in different levels of the vessel is varied so as to provide varying total heat transfer corresponding to varying loads during the progress of the reaction. The arrangement shown in Figure 5 is particularly well adapted for the catalyst regeneration reaction.

It has been found that in order to substantially eliminate the irregularities in catalyst flow caused by the use of a great number of gas distributing and collecting trough members in a single vessel, the serrations in the lower edges of the distributing trough members and those collecting trough members receiving gas only from the column therebelow should measure at least about 1 to 3 inches from base to apex of each serration. It has been found that serrations having sides forming an angle of the order of 50 to 70 degrees with the horizontal are satisfactory.

It should be understood that the specific details of apparatus construction and of application of this invention given hereinabove are intended merely as exemplary and are not to be construed as limiting the scope of this invention except as it may be limited by the following claims.

I claim:

1. An apparatus for conversion of hydrocarbons in the presence of a particle form catalyst which comprises: an elongated reaction vessel having a catalyst inlet at its upper end and a catalyst outlet at its lower end, flow throttling means associated with said outlet, a plurality of superposed sets of gas distributing and collecting inverted trough members spaced across said vessel at spaced vertical intervals; each set comprising two vertically spaced rows of horizontally spaced gas collecting trough members, the troughs in the upper row having serrated lower edges and the trough in the lower row having substantially non-serrated lower edges, and a row of gas distributing trough members having serrated lower edges spaced substantially midway vertically between said two rows of gas collecting trough members; means to supply gaseous hydrocarbon reactants to each of said gas distributing trough members and means to withdraw gaseous reaction products from each of said gas collecting trough members.

2. An apparatus wherein a carbonaceous deposit is burned from a particle form contact mass material by the action of a combustion supporting gas at controlled elevated temperature comprising an elongated vertical vessel suitable for confining a substantially compact column of downwardly moving solid contact material; means to withdraw regenerated contact material from the lower end of said vessel; a plurality of superposed sets of gas distributing and collecting inverted trough members spaced across said vessel at spaced vertical intervals;

each set comprising two vertically spaced rows of horizontally spaced gas collecting trough members, the troughs in the upper row having serrated lower edges and the trough in the lower row having substantially non-serrated lower edges, and a row of gas distributing trough members having serrated lower edges spaced substantially midway vertically between said two rows of gas collecting trough members; means to supply combustion supporting gas to each of said gas distributing trough members and means to withdraw spent regenerating gas from each of said gas collecting trough members; heat transfer conduits spaced uniformly across said vessel between at least most of said superposed sets of trough members and means to pass a fluid heat exchange medium through said conduits.

3. An apparatus for conversion of hydrocarbons in the presence of a particle form catalyst which comprises: an elongated reaction vessel having a catalyst inlet at its upper end and a catalyst outlet at its lower end, flow throttling means associated with said outlet, a plurality of superposed sets of gas distributing and collecting inverted trough members spaced across said vessel at spaced vertical intervals; each set comprising two vertically spaced rows of horizontally spaced gas collecting trough members, the troughs in the upper row having serrated lower edges and the trough in the lower row having substantially non-serrated lower edges, and a row of gas distributing trough members having serrated lower edges spaced substantially midway vertically between said two rows of gas collecting trough members; means to supply gaseous hydrocarbon reactants to each of said gas distributing trough members and means to withdraw gaseous reaction products from each of said gas collecting trough members, heat transfer conduits positioned between the gas distributing trough member and the gas collecting trough member therebelow in at least most of said sets and means to pass fluid heat exchange medium through said heat transfer conduits.

FRANK C. FAHNESTOCK.

REFERENCES CITED

The following references are of record in the file of this patent:

UNITED STATES PATENTS

| Number | Name | Date |
|---|---|---|
| 1,905,883 | Barstow | Apr. 25, 1933 |
| 2,362,621 | Fahnestock | Nov. 14, 1944 |
| 2,386,670 | Evans | Oct. 9, 1945 |